H. S. HOLMES.
METHOD OF AND APPARATUS FOR ELECTRIC WELDING.
APPLICATION FILED AUG. 17, 1918.

1,290,997.

Patented Jan. 14, 1919.
3 SHEETS—SHEET 1.

Inventor
Henry S. Holmes
By his Attorney

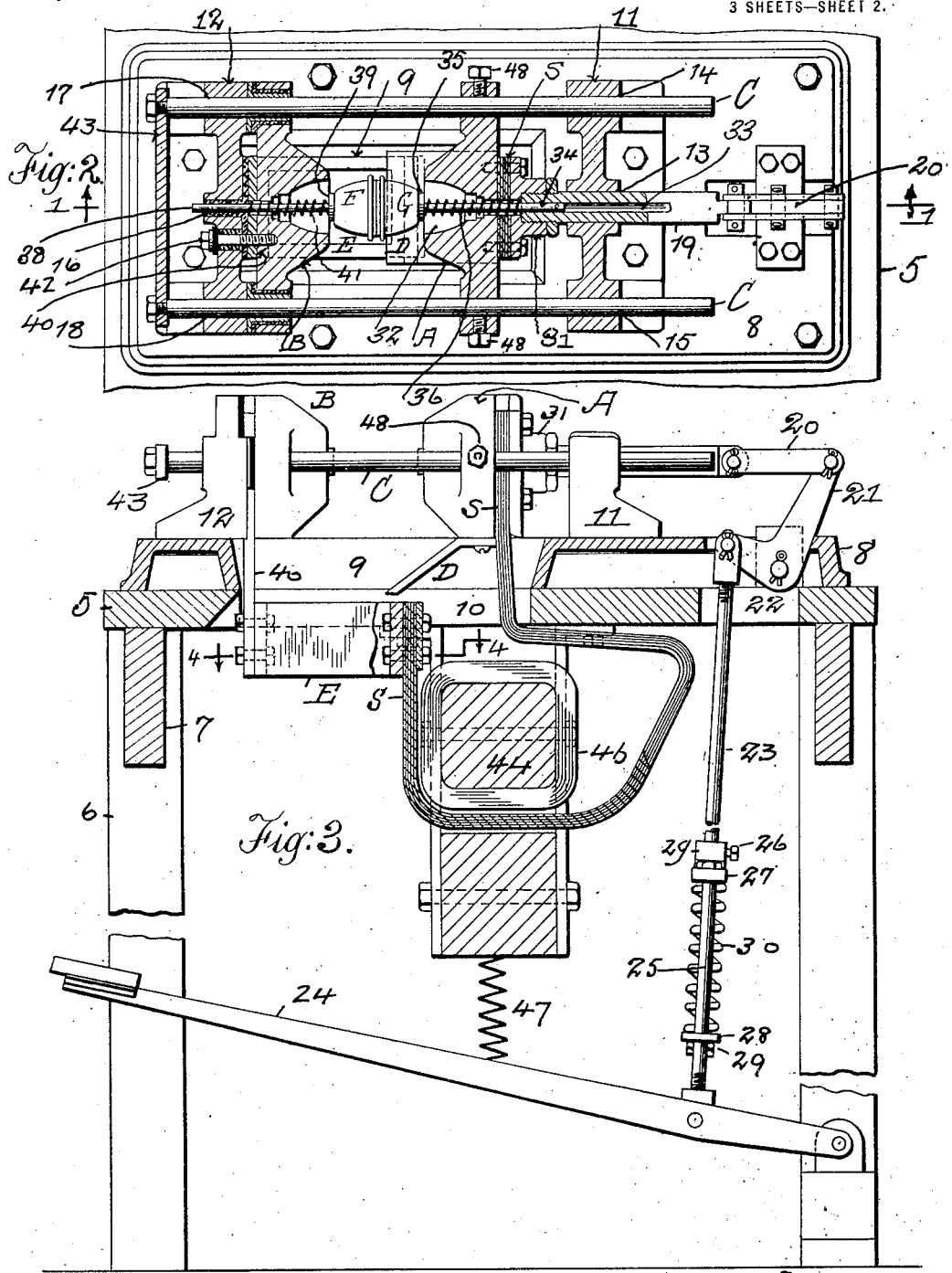

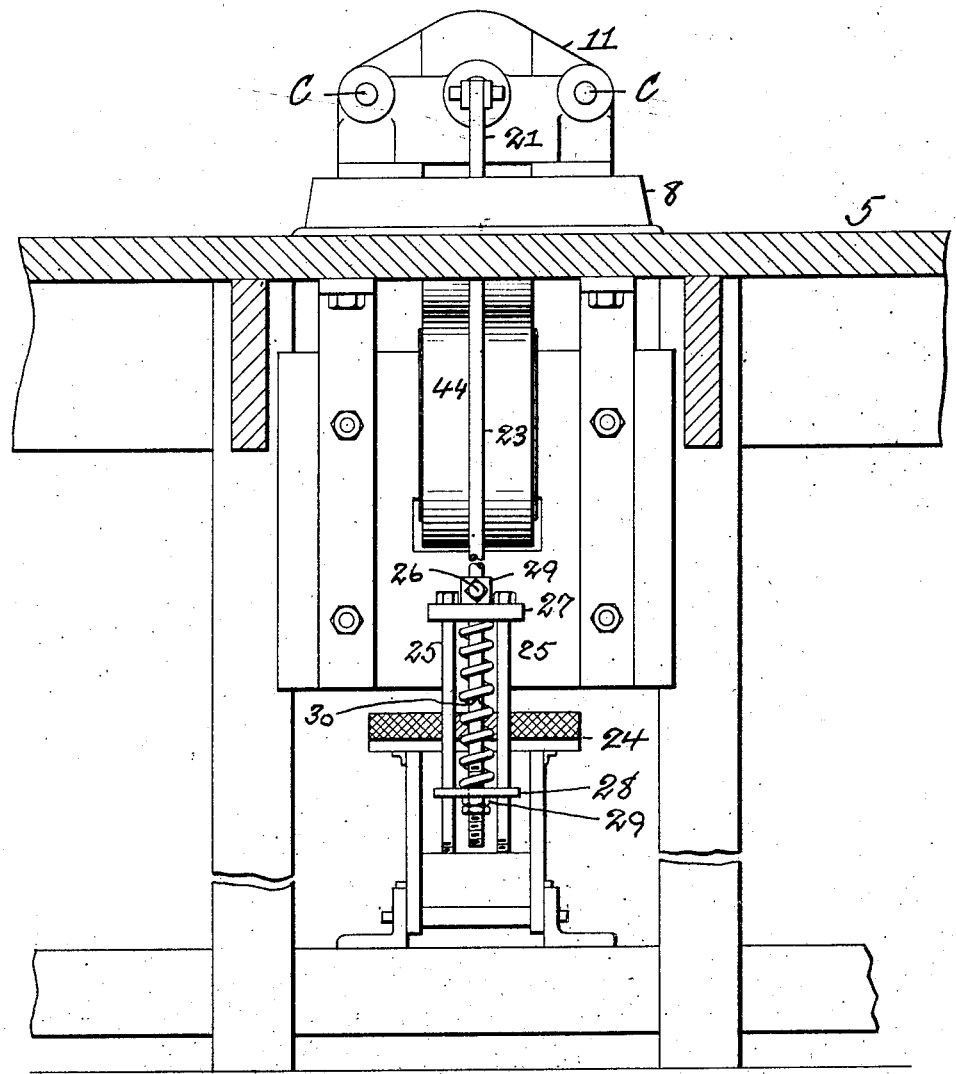

UNITED STATES PATENT OFFICE.

HENRY S. HOLMES, OF BROOKLYN, NEW YORK, ASSIGNOR TO THOMAS E. MURRAY, OF NEW YORK, N. Y.

METHOD OF AND APPARATUS FOR ELECTRIC WELDING.

1,290,997.     Specification of Letters Patent.     Patented Jan. 14, 1919.

Application filed August 17, 1918. Serial No. 250,284.

*To all whom it may concern:*

Be it known that I, HENRY S. HOLMES, a citizen of the United States, residing at Brooklyn, in the county of Kings and State of New York, have invented a certain new and useful Improvement in Methods of and Apparatus for Electric Welding, of which the following is a specification.

The invention relates to a method of electric welding, and to an apparatus whereby I may carry said method into practical effect.

In performing my method, I place the two objects or bodies to be welded between resilient supports on the welding electrodes, and I approximate said electrodes, thus subjecting said bodies to a certain resilient pressure. I then subject said bodies to a much increased resilient and regulated pressure, and then while under such pressure I establish the welding current and unite the bodies. The initial pressure holds the bodies in accurate welding position and insures their contact registry during the entire approximating movement of the electrode, or electrodes, as the case may be; so that when the final heavy pressure is applied, the welding current may be at once established, insuring the production of a satisfactory joint.

The particular embodiment of my invention herein illustrated is a machine for welding together the interchangeable cup-shaped sheet metal section of a hand grenade. Two such sections are placed with their edges in registry between resilient supports disposed in recesses in the opposing faces of a fixed and a movable electrode. These supports then operate to hold together the sections which are introduced by the hand of the operator. The movable electrode is then moved by means of a foot treadle lever toward the fixed electrode, the resilient supports yielding and the sections being finally seated in the recesses in the electrodes. While the electrode is being moved, it is guided accurately by suitable guide rods entering fixed brackets on the bed of the machine. As soon as the seating is accomplished, the increased resistance offered to the depression of the foot treadle brings into action a strong spring interposed between the treadle lever and the rod operated thereby communicating with the movable electrode, by which spring a greatly increased resilient pressure is exerted on the objects to be welded. Coincidently with this increased pressure the welding current is established, and the said objects united.

In the accompanying drawings—

Figure 1:
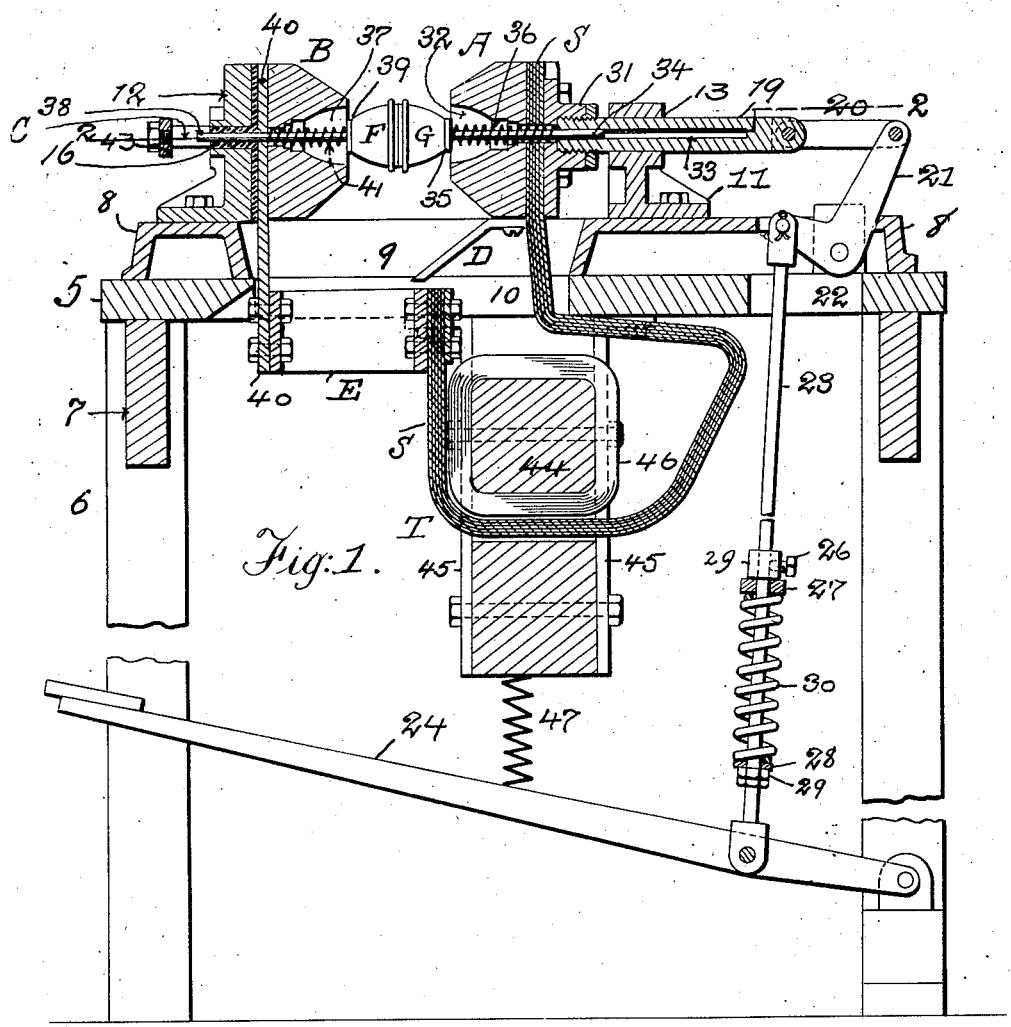
Figure 4:
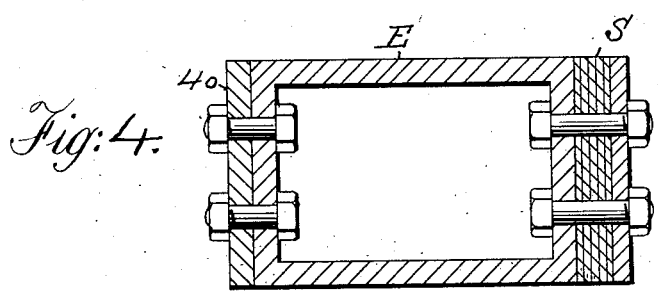

Figure 1 is a vertical section of my electric welding machine on the line 1, 1 of Fig. 2, the bell crank lever, operating rod and treadle, and also the grenade to be welded, being shown in elevation. Fig. 2 is a horizontal section on the line 2, 2 of Fig. 1. Fig. 3 is a side elevation, the table 5, the bed 8 thereon, the bed supporting cross beams 7, the transformer core 44 and the rectangular frame E, to which one terminal of the secondary is connected, being shown in section. Fig. 4 is an enlarged horizontal section of the frame E on the line 4, 4 of Fig. 3. Fig. 5 is an elevation of the right hand side of the machine, as shown in Figs. 1 and 3.

Similar numbers and letters of reference indicate like parts.

The table 5 is supported on standards 6 and cross beams 7. Upon the table 5 is the bed 8. There is an opening 9 in bed 8 which registers with a similar opening 10 in table 5. Bolted to bed 8 and on opposite sides of the opening 9 are brackets 11 and 12. Bracket 11 has a middle opening at 13 and end openings at 14, 15. Bracket 12 has a middle opening at 16 and end openings at 17, 18. Through the middle opening 13 of bracket 11 passes a rod 19 which at its outer end is pivoted to a link 20, which in turn is pivoted to the long arm of a bell crank lever 21 pivoted on bed 8. The short arm of lever 21 is pivoted to a rod 23 which extends downwardly through an opening 22 in table 5.

Pivoted in one of the standards 6 is a treadle lever 24, secured to which are two fixed rods 25, Fig. 5, loose upon which are two cross-bars 27, 28. The rod 23 passes freely through both bars 27, 28, and is threaded at its lower end to receive a nut 29. The rods 25 are headed above bar 27, and on the rod 23 above said bar 27 is an adjustable stop 29 having a clamping bolt 26. Inclosing rod 23 and between bars 27, 28, is a helical spring 30.

From the foregoing it will be apparent that if there be a sufficient resistance to the the sliding movement of the rod 19, then the depression of the treadle lever 24 by the foot of the operator will cause said lever to draw down the rods 25 and cross bar 27, so compressing helical spring 30. The purpose of this will be noted farther on.

The inner end of sliding rod 19 is threaded to enter a circular clamping head 31. Between head 31 and the electrode A is interposed one terminal of the flexible laminated secondary S of the transformer T, suitable bolts securing said head, electrode and secondary together.

The electrode A has a central cup-shaped recess 32, and a central opening communicating therewith and registering with openings in the secondary S and head 31 and with a bore 33 in rod 19. A stem 34 centrally disposed in said recess and openings has a head 35, and between head 35 and the end of rod 19 and in said recess and openings is a helical setting out spring 36.

The opposite electrode B is formed similarly to electrode A, with a central cup-shaped recess 37 and stem 38 having head 39. The stem 38 here passes through a central opening in a vertical metal plate 40 (purpose hereafter explained) and through an insulating bushing in the central opening of bracket 12. A layer of insulating material is interposed between plate 40 and bracket 12. A helical setting out spring 41 bears on said insulating layer and also on the head 39 of stem 38. The electrode B is secured to bracket 12 by insulated bolt 42, Fig. 2.

Extending through the side openings in electrodes A, B and brackets 11, 12 are guide rods C united by a cross bar 43. On the under side of electrode A is an inclined guide plate D which extends over the opening in a quadrangular frame E, Figs. 1 and 3. This frame is supported below the openings 9, 10 in the bed 8 and table 5 by the metal plate 40, and at the same time by said plate is electrically connected to electrode B. To the opposite side of frame E is clamped the terminal of secondary S of transformer T. The quadrangular transformer core 44 is bolted between plates 45, secured to the under side of table 5, and receives the primary winding 46. A helical retracting spring 47 is attached to the treadle lever and to the under side of said core.

The operation is as follows: The object to be welded is here a hand grenade of sheet metal formed of two similar cup-shaped sections F, G, the bottoms of the sections being flattened. The sections are placed with their edges in contact between the heads 35, 39, on stems 34, 38, the springs 36, 41, then being slightly compressed, and thus holding the sections together. The operator then depresses the treadle lever 24, thus, through the rod 23 and bell crank lever 21 and sliding rod 19, causing the electrode A to move toward electrode B. As the guide rods C are clamped by set screws 48 in the electrode A, they move with said electrode, sliding freely through electrode B and bracket 12, and insure the travel of the electrode in a rectilinear path. The springs 36, 41, then became compressed, and the grenade sections F, G enter and become seated in the recesses in the electrodes A, B. The resiliency of springs 36, 41, is to be such as to permit of this seating of the grenade sections in the electrodes before sufficient resistance is offered to the movement of electrode A to effect compression of spring 30 to any material extent. After the seating is effected, however, further depression of treadle lever 24 causes compression of spring 30, which reacting on the grenade sections F, G forces their edges together with greatly augmented pressure. The welding current to the transformer is now established by the operator, and the sections F, G, are instantly united. The operator then releases the treadle lever which, being retracted, separates the electrodes, bringing them back to the position of Fig. 1. He then pushes the completed grenade downwardly from between the stem heads 35, 39, so that it falls on the inclined guide plate D, and thus is directed through the opening in frame E, whence it falls to the floor or into any suitable receptacle placed to receive it.

By releasing the clamping screws 48, the guide rods C may be adjusted with reference to the movable electrode A. By loosening screw 26, the stop 29 may be adjusted to vary the tension of spring 30, and this can also be done by means of nut 29.

The machine as here illustrated can be operated as fast as the attendant can adjust the objects between the electrodes, and at the present time is in actual use welding about 840 grenades per hour.

I claim:

1. An electric welding machine, comprising a fixed electrode, a movable electrode, the said electrodes receiving the bodies to be welded, means in said electrodes for holding the bodies in welding contact, mechanism for moving the movable electrode toward said fixed electrode, and means interposed in said moving mechanism for subjecting the bodies to be welded to gradually increasing resilient pressure.

2. An electric welding machine, comprising relatively movable electrodes receiving between them the bodies to be welded, resilient supports for said bodies carried by said electrodes, mechanism for approximating said electrodes to subject said bodies to initial resilient pressure between said supports, and means interposed in said approximating mechanism for subjecting said bodies to increased resilient pressure.

3. An electric welding machine, comprising electrodes having recesses in their opposing faces, resilient supports for the bodies to be welded disposed in said recesses, mechanism for moving one of said electrodes to subject said bodies to pressure between said resilient supports and to seat said bodies in said recesses, and means interposed in said moving mechanism for subjecting said seated bodies to increased pressure.

4. An electric welding machine, comprising a bed, a fixed electrode thereon, an electrode slidable on said bed, resilient supports for the bodies to be welded disposed on said electrodes, and mechanism for moving said slidable electrode toward and from said fixed electrode.

5. An electric welding machine, as in claim 4, further comprising fixed brackets on said bed, and guide bars secured to said slidable electrode and themselves slidable in openings in said brackets.

6. An electric welding machine, comprising a bed, two fixed brackets thereon, a fixed electrode supported on one of said brackets, a movable electrode facing said fixed electrode, and guide-rods secured in said movable electrode and slidable in openings in said brackets.

7. An electric welding machine, as in claim 6, the said guide-rods being adjustable in said movable electrode, and means for clamping said rods in adjusted position.

8. An electric welding machine, comprising a fixed electrode, a movable electrode, the said electrodes having registering recesses to receive the objects to be welded, and, in each electrode, a central opening communicating with the recess therein, a stem in said recess and opening, a head on said stem, and a helical setting out spring for said stem.

9. An electric welding machine, comprising a bed, a fixed electrode thereon, a slidable electrode thereon, a fixed bracket on said bed having an opening, a rod connected to said slidable electrode and extending through said opening, a bell crank lever on said bed and having one arm connected to said rod, a vertical rod connected to the other arm of said bell crank lever, a treadle lever, and, interposed between said vertical rod and said treadle lever, a spring compressible by the depression of said treadle lever.

10. An electric welding machine, comprising a bed having an opening, a fixed electrode and a movable electrode on said bed and above said opening, resilient supports on said electrodes for the objects to be welded, a horizontal frame below said fixed electrode and electrically connected thereto, a transformer, a flexible secondary for said transformer having one terminal connected to said frame and the other terminal extending through said bed opening and secured to said movable electrode, and an inclined guide plate carried by said movable electrode and extending over said frame.

11. The method of electric welding which consists, first, in engaging the objects to be welded between resilient supports disposed in recesses in the welding electrodes; second, moving said electrodes together to compress said resilient supports and seat said objects in said recesses; third, forcing said electrodes together to augment the pressure between said objects at the joint, and fourth, establishing the welding current to unite said objects.

In testimony whereof I have affixed my signature in presence of two witnesses.

HENRY S. HOLMES.

Witnesses:
GERTRUDE T. PORTER,
MAY T. MCGARRY.